Nov. 29, 1927.
D. M. BARDON
CHOKER HOOK
Filed Feb. 11, 1924
1,651,081
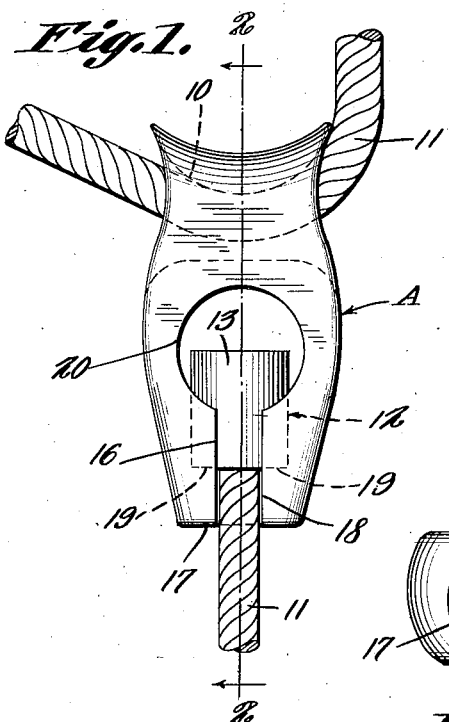
Fig. 1.
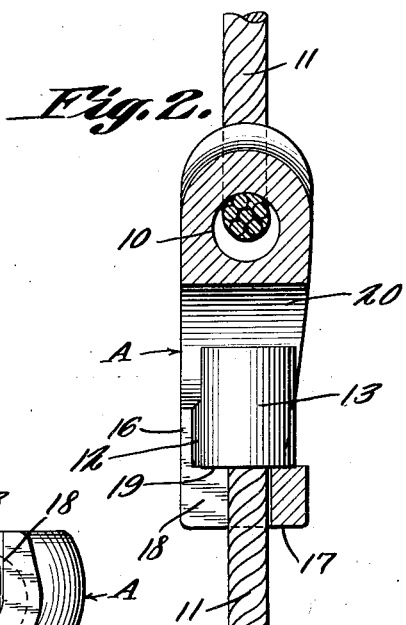
Fig. 2.
Fig. 3.
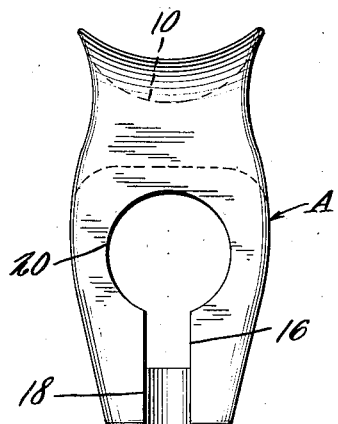
Fig. 4.
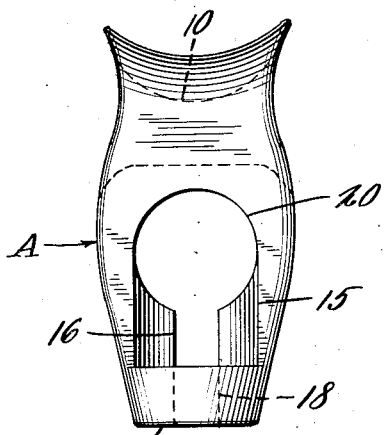
Fig. 5.
D. M. Bardon, Inventor
By Victor J. Evans
Attorney
WITNESS:
P. T. Hickey.

Patented Nov. 29, 1927.

1,651,081

UNITED STATES PATENT OFFICE.

DONIS M. BARDON, OF SEATTLE, WASHINGTON.

CHOKER HOOK.

Application filed February 11, 1924. Serial No. 692,200.

It is the purpose of this invention to provide a choker hook constructed to minimize, if not absolutely prevent the cable from being accidently separated from the hook under any circumstance, and to also provide a hook comparatively light in weight, and one wherein the cable can be easily associated with or removed from the hook as the occasion may require.

The particular object of my invention is to provide an improved choker-hook of the type described by the patent issued to Andrew Opsal, Apr. 6, 1906, Pat. No. 917,738, which was found unsafe in practical work, and therefore abandoned as inoperative.

In order to bring out the purposes of my invention, it is convenient to state that said Opsal choker-hook consists of a slip-sleeve having an integral, lateral, socketed projection, adapted to receive and engage an elongate enlargement or ferrule, provided on the noose-end of the choker-cable. One side of the socket has a longitudinal slot adapted to pass the cable but not the ferrule; the free end of the slot is provided with an interior shoulder adapted to receive said noose-end and engage the ferrule. That end of the socket adjacent the slip-sleeve was open, and in consequence an accidental thrust imposed on the noose-end while not under pull tended to push the ferrule out of the socket and thus unfastened the noose-end.

The further particular object of my invention is so to improve said type of choker-hook that the chances of accidental unfastening of said noose-end are reduced to a minimum degree, if not entirely eliminated; at the same time so to construct my choker-hook that its use is rendered convenient; also to provide a choker-hook of simple construction, and relatively inexpensive to manufacture.

A further particular object of my invention is to provide a choker-hook of ample strength and at the same time of as light weight as possible; and having those parts which must sustain the hauling strain so designed and arranged as to be under tension only, and so as not to be subjected to bending stresses when under pull.

A further object of my invention is to eliminate undue stress being imposed upon my choker-hook while at work, due to the hook having protruding portions tending to catch on obstructions; or likely to be broken by the crush of adjacent logs impacting against each other; for on the Pacific coast and Northwestern States, where my invention probably has its greatest use, the logs are frequently of great size and weight.

A further object of my invention is to avoid kinking of said noose-end, as is likely to be caused if held too rigidly in the socket of the choker-hook, and the noose-end while not under pull, is accidentally subjected to end thrust; such kinking tending greatly to increase the chances of accidental unfastening of the choker-line, and also tending to render working with the choker-hook difficult.

I attain my object in the combination of a choker-cable provided with an elongate enlargement at its noose end, and a choker-hook consisting of a slip-sleeve provided with an integral, lateral socket normal with the axis of the sleeve, having substantially unbroken straight walls on two opposite sides arranged to receive and completely house said enlargement, a third wall provided with an entrance aperture for said noose-end and its enlargement, and the remaining side of the socket being left open. The sleeve closes the adjacent end of the socket, the opposite or free end of the latter being provided with an interior transverse shoulder adapted to receive said noose-end and engage its enlargement, thus placing the said side-walls in direct tension only, said shoulder spanning and closing said open side of the socket at its free end.

Furthermore, in order to get the greatest strength for the least metal, I preferably extend the two opposite walls of the socket from the ends of the sleeve in planes normal with the axis of the latter and make such side walls approximately of the same width as the sleeve.

Furthermore, since the body of my choker-hook is formed in its entirety to provide substantially plane, smooth exterior surfaces throughout, it has no protrusions prone to catch on obstructions, or to be broken down on impact with another body. And the open side of the socket of my choker-hook serves to permit the projection of the ferruled noose-end thus to relieve accidental end thrust to which the noose-end may be subjected while my choker-hook is at work.

The details and advantages of my invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view in elevation of the choker hook showing the cable associated therewith, the view being taken looking at that side wall of the socket of my choker-hook provided with the entrance aperture for the noose-end of the choker cable and its ferruled end.

Figure 2 is a sectional view taken on the line 2—2 of Figure 1.

Figure 3 is a bottom plan view of the devices shown in Figs. 1 and 2, omitting the choker cable.

Figure 4 is an elevation similar to Fig. 1, but omitting the choker-cable, and

Figure 5 is a view looking at the open side of my choker-hook with the cable removed.

Referring to the drawing in detail: A indicates generally the body of my choker-hook which comprises a slip-sleeve 10 to receive the cable 11. The end openings of the slip sleeve is preferably convexed to permit the cable 11 to slip easily therethrough and to minimize wear of the cable as will be readily understood.

The slip-sleeve is provided with an integral, lateral socket A. The axis of the socket 12 extends normal to the axis of the sleeve, and the socket is adapted to receive and completely house the elongate enlargement or ferrule 13 provided on the extremities of the noose-end of the choker-cable.

The slip-sleeve 10 closes the adjacent end of the socket, and thus serves to retain said ferrule 13 in the socket. The opposite, or free end of the socket is provided with an interior transverse shoulder 19 through which the choker-cable 11 may extend, but by which its ferrule 13 will be engaged.

The two opposite side-walls $a'$, $a'$, of the body of the socket extend uniformly, substantially straight and unbroken, from the sleeve 10 to said shoulder 19, and thus firmly support the latter; and preferably these side walls are arranged in planes normal to the axis of the sleeve 10, and so as to extend from the ends of and of the same width as the latter. This construction insures sufficient strength, for since these side walls have no cut-away portions, they are not subjected to any bending stresses in service. The side wall $a^2$ of the socket is provided with an entrance aperture for the noose-end of the cable and its ferrule 13. Said entrance aperture consists of a longitudinal slot 16 of uniform width adapted to pass the choker-cable, but not its ferrule, and termination adjacent the sleeve in a transverse opening 20 adapted to pass said ferrule, but only when positioned at right angles with the axis of the socket. The ferrule 13, and the transverse opening 20 are so relatively proportioned that the former cannot be displaced from the socket of my choker-hook until positioned as described.

The side 15 of said socket, located opposite its said side-wall $a^2$, is substantially open and is spanned and closed at its free end by said shoulder 19.

In work the noose-end of the choker-cable is subjected to end thrust which, if not relieved, tends to kink it and thus to promote its disengagement from my choker-hook; also renders it inconvenient to use. Said open side 15, however, serves to permit the projection of the ferruled end of the choker-cable out of the socket of my choker-hook; at the same time keeping said ferruled end in place for re-engagement with the shoulder 19 of the socket when the noose of the choker-cable is again tightened.

Since the body of my choker-hook in its entirety presents substantially plane, straight, smooth peripheral or exterior surfaces throughout, it does not present any protruding portions which are likely to catch on obstructions, or to be broken down in the crush due to the log fastened by the choker-line having violent impact with another log, or obstructions on the ground.

To engage the ferruled end of the choker-cable with my choker-hook, the ferrule 13 will have to be so positioned that its axis is substantially at right angles with the axis of said socket, and aligned with the center of the transverse opening 20, of the socket. The ferruled end having been inserted through the latter opening is then turned down, thus passing the cable end 11 through the slot 16 into the socket, and bringing said cable end into the space 18 between the sides of the shoulder 19; and a pull on the cable will then engage its ferrule with said shoulder.

To disengage the ferruled end of the cable from my choker-hook it would be necessary to go reversely through the same operations as described for effecting its engagement.

Since the socket of my choker-hook is enclosed by walls on three sides, it is kept substantially from becoming clogged by matter picked up while the log carried by the choker-line is being hauled over the ground.

The construction of my choker-hook while being comparatively light in weight possesses the desired strength and durability for the purpose for which it is intended, and the choker line can be conveniently connected with or removed from the hook when necessary.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. In combination, a cable provided at its end with a retaining enlargement and a choker-hook comprising a sleeve through which said cable is extended and provided with a transverse opening of smaller diameter than the length of said enlargement through which said enlargement can only be projected endwise, and a longitudinal slot leading from said transverse opening through the base of the choker-hook for receiving the cable and having its rear end closed to form a seat for the said enlargement, shoulders formed along opposite edges of the open side of the slot from the seat to said transverse opening to prevent displacement of the enlargement from the choker-hook except when turned at a right angle to the axis of the slot.

2. In a choker-line, the combination of a choker-cable provided with an enlargement at its noose-end, and a choker-hook consisting of a slip-sleeve provided with an integral lateral socket normal with the axis of the sleeve, said socket having substantially straight unbroken walls on two opposite sides thereof, a third side-wall provided with an entrance aperture for said noose-end and its enlargement, and the remaining side of the socket being substantially open; said walls being arranged to receive and house said enlargement; the sleeve closing the adjacent end of the socket, and the free end of the latter being provided with an interior transverse shoulder adapted to receive said noose-end and engage its said enlargement, thus placing the said side-walls in direct tension only; said shoulder spanning and closing said open side of the socket at its said free end; said entrance aperture consisting of a longitudinal slot, extending to said free end and adapted to pass said noose-end but not its enlargement, and terminating adjacent the sleeve in a transverse opening adapted to pass said enlargement, but only when positioned at right angles with the axis of the socket.

3. In a choker-line, the combination of a choker-cable provided with an enlargement at its noose-end, and a choker-hook consisting of a slip-sleeve provided with an integral lateral socket normal with the axis of the sleeve, said socket having substantially straight unbroken walls on two opposite sides thereof, said side walls extending from the ends of the sleeve in planes normal with the axis of the latter; said socket further having a third side-wall provided with an entrance aperture for said noose-end and its enlargement, and the remaining side of the socket being substantially open; said walls being arranged to receive and house said enlargement; the sleeve closing the adjacent end of the socket, and the free end of the latter being provided with an interior transverse shoulder adapted to receive said noose-end and engage its said enlargement, thus placing the said side-walls in direct tension only; said shoulder spanning and closing said open side of the socket at its said free end; said entrance aperture consisting of a longitudinal slot extending to said free end and adapted to pass said noose-end but not its enlargement, and terminating adjacent the sleeve in a transverse opening adapted to pass said enlargement, but only when positioned at right angles with the axis of the socket.

4. In a choker-line, the combination of a choker-cable provided with an enlargement at its noose-end, and a choker-hook consisting of a slip-sleeve provided with an integral lateral socket normal with the axis of the sleeve, said socket having substantially straight unbroken walls on two opposite sides thereof, said side-walls extending from the ends of the sleeve in planes normal with the axis of, and being approximately of the same width as the sleeve; said socket further having a third side-wall provided with an entrance aperture for said noose-end and its enlargement, and the remaining side of the socket being substantially open; said walls being arranged to receive and house said enlargement; the sleeve closing the adjacent end of the socket, and the free end of the latter being provided with an interior transverse shoulder adapted to receive said noose-end and engage its said enlargement, thus placing the said side-walls in direct tension only; said shoulder spanning and closing said open side of the socket at its said free end; said entrance aperture consisting of a longitudinal slot extending to said free end and adapted to pass said noose-end but not its enlargement, and terminating adjacent the sleeve in a transverse opening adapted to pass said enlargement, but only when positioned at right angles with the axis of the socket.

5. In combination, a cable provided at its end with an enlargement and a choker-hook having a sleeve through which the cable extends and having a transverse opening into which the enlargement is projected endwise, and a longitudinal slot leading from said transverse opening through the base of the choker hook for receiving the cable and having its base end closed at one side to form a seat for the inner end of the enlargement in opposed relation to the top of the transverse opening which serves as an abutment for the upper end of the enlargement and shoulders formed along opposite edges of the open side of the slot for preventing displacement of the enlargement except when turned axially of the transverse opening.

In testimony whereof I affix my signature.

DONIS M. BARDON.